(12) United States Patent
Yun et al.

(10) Patent No.: US 9,167,299 B2
(45) Date of Patent: Oct. 20, 2015

(54) METHOD OF MANAGING THE STANDBY MODE OF A BROADCAST RECEIVING DEVICE BY EXTERNAL SIGNALING

(75) Inventors: Jung Mee Yun, Seongnam-si (KR); Sang Hak Lee, Seongnam-si (KR); Jang Kyu Lee, Seoul (KR); Jong Chul Weon, Seoul (KR); Young Min Chae, Suwon-si (KR); Jeong Ku Lee, Yongin-si (KR)

(73) Assignee: KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 57 days.

(21) Appl. No.: 14/111,434

(22) PCT Filed: Aug. 26, 2011

(86) PCT No.: PCT/KR2011/006326
§ 371 (c)(1),
(2), (4) Date: Oct. 11, 2013

(87) PCT Pub. No.: WO2012/141389
PCT Pub. Date: Oct. 18, 2012

(65) Prior Publication Data
US 2014/0047495 A1 Feb. 13, 2014

(30) Foreign Application Priority Data

Apr. 13, 2011 (KR) .................. 10-2011-0034352

(51) Int. Cl.
*H04N 21/443* (2011.01)
*H04N 5/63* (2006.01)

(52) U.S. Cl.
CPC ............ *H04N 21/4436* (2013.01); *H04N 5/63* (2013.01)

(58) Field of Classification Search
USPC .................. 725/132, 100, 114, 139, 151, 152
See application file for complete search history.

(56) References Cited

U.S. PATENT DOCUMENTS

| 6,799,328 | B1* | 9/2004 | Freimann et al. | 725/44 |
| 7,437,122 | B2* | 10/2008 | Choi | 455/7 |
| 2009/0041438 | A1* | 2/2009 | Kuno | 386/126 |
| 2010/0058322 | A1* | 3/2010 | Oikawa et al. | 717/173 |

* cited by examiner

*Primary Examiner* — Nnenna Ekpo
(74) *Attorney, Agent, or Firm* — Hauptman Ham, LLP

(57) ABSTRACT

A method for managing a broadcast receiving apparatus standby mode according to external signaling is provided. The method includes: generating a power management descriptor that a broadcast receiving apparatus refers to in order to perform a standby mode; and transmitting the generated power management descriptor to the broadcast receiving apparatus. Accordingly, since the broadcast receiving apparatus manages the standby mode more effectively, standby power consumed in the standby mode is further reduced and thus power saving effect can be achieved.

12 Claims, 12 Drawing Sheets

Active Standby Mode

| PID | Table ID | Name | Description |
|---|---|---|---|
| 0x10 | 0x40 | NIT | Network Information Table |
| 0x11 | 0x42 | SDT | Service Description Table |
| 0x14 | 0x70 | TDT | Time and Date Table |
| 0x12 | 0x4E | EIT P/F | Event Information Table (Present/Follow) |
| 0x12 | 0x50 ~ 0x5F | EIT | Event Information Table (Schedule) |

FIG. 9

| Tag | Name | Position |
|---|---|---|
| 0x40 | Network Name Descriptor | NIT |
| 0x41 | Service List Descriptor | NIT |
| 0x48 | Service Descriptor | SDT |
| 0x4D | Short Event Descriptor | EIT |
| 0x4E | Extended Event Descriptor | EIT |
| 0x54 | Content Descriptor | SDT, EIT |
| 0x55 | Parental Rating Descriptor | EIT |

FIG. 10

| Tag | Name | Position |
|---|---|---|
| 0x80 | Power_management descriptor | NIT (common loop) |
| 0x81 | fw_update_descriptor | NIT (common loop) |
| 0x82 | EIT_update_descriptor | EIT p/f |
| 0x83 | app_update_descriptor | SDT (service loop) |
| 0x84 | terminal_management_descriptor | SDT (service loop) |

FIG. 11

| Syntax | Bits | Mnemonic |
|---|---|---|
| power_management_descriptor(){ | | |
|   descriptor_tag | 8 | uimsbf |
|   descriptor_length | 8 | uimsbf |
|   terminal_power_mode | 8 | uimsbf |
|   for(i=0;i<N;i++){ | | |
|     service_mode | 8 | uimsbf |
|   } | | |
| } | | |

FIG. 12

| value | meaning |
|---|---|
| 0 | Always Active Mode |
| 1 | support passive standby mode only |
| 2 | support active/passive standby mode |

FIG. 13

| item_char | meaning |
|---|---|
| 'F' | fw_update_descriptor |
| 'E' | EIT_update_descriptor |
| 'A' | app_update_descriptor |
| 'M' | terminal_management_descriptor |

FIG. 14

| Syntax | Bits | Mnemonic |
|---|---|---|
| fw_update_descriptor(){ | | |
|   descriptor_tag | 8 | uimsbf |
|   descriptor_length | 8 | uimsbf |
|   start_time | 40 | bslbf |
|   duration | 24 | uimsbf |
|   free_CA_mode | 1 | bslbf |
| } | | |

FIG. 15

| Syntax | Bits | Mnemonic |
|---|---|---|
| EIT_update_descriptor(){ | | |
|   descriptor_tag | 8 | uimsbf |
|   descriptor_length | 8 | uimsbf |
|   for(i=0;i<N;i++){ | | |
|     EIT_type | 8 | uimsbf |
|     last_descriptor_number | 4 | uimsbf |
|     start_time | 40 | bslbf |
|     duration | 24 | uimsbf |
|   } | | |
|   free_CA_mode | 1 | bslbf |
| } | | |

FIG. 16

| value | meaning |
|---|---|
| 0 | EIT p/f type |
| 1 | EIT sch type |
| 2 | reserved |

FIG. 17

| Syntax | Bits | Mnemonic |
|---|---|---|
| terminal_managment_descriptor(){ | | |
|   descriptor_tag | 8 | uimsbf |
|   descriptor_length | 8 | uimsbf |
|   subscriber_id | 8 | uimsbf |
|   reserved | 8 | uimsbf |
|   for(i=0;i<N;i++){ | | |
|     private_data_byte | 8 | uimsbf |
|   } | | |
|   CRC_32 | 32 | rpchof |
| } | | |

METHOD OF MANAGING THE STANDBY MODE OF A BROADCAST RECEIVING DEVICE BY EXTERNAL SIGNALING

CROSS-REFERENCE TO RELATED APPLICATION

This application claims priority from Korean Patent Application No. 10-2011-0034352, filed on Apr. 13, 2011 in the Korean Intellectual Property Office, the disclosure of which is incorporated herein by reference in its entirety.

BACKGROUND

1. Field

Methods and apparatuses consistent with exemplary embodiments relate to a method for managing a broadcast receiving apparatus standby mode, and more particularly, to a method for managing a standby mode of a broadcast receiving apparatus to reduce power consumption in a non-use time zone.

2. Description of the Related Art

How much TV a household watches varies from region to region. However, the maximum TV viewing time is about 8 hours, which is one-third of a day, and it is common that the TV operates in a standby mode, in which people do not watch the TV, for the rest of time.

However, most of the set top boxes (STB) sold today do not support the standby mode. Even though the STB supports the standby mode, it uses only 10-20% less power in the standby mode than in an on mode.

Figure 1:
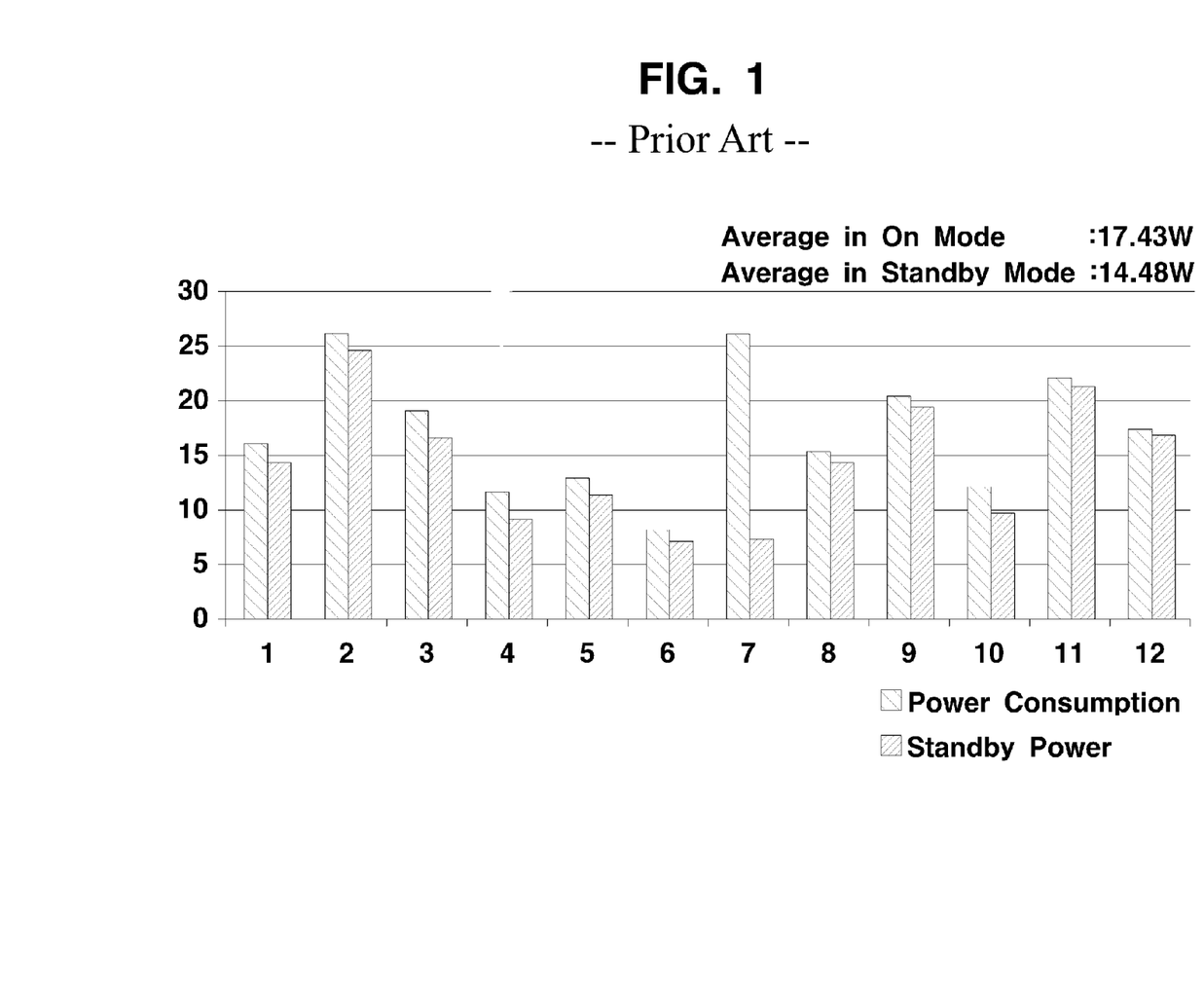
FIG. 1 is a view illustrating power consumption and standby power in a related-art STB.

FIG. 1 is a view illustrating power consumption and standby power in a related-art STB. It can be seen from FIG. 1 that average power consumption of the STB in the standby mode is 14.48 W, which is a very high level.

It is a worldwide trend to green all image devices, and the international energy agency recommends that home appliances should reduce standby power to no more than 1 W.

Therefore, there is a demand for a method for managing a standby mode of a broadcast receiving apparatus such as a STB effectively and reducing standby power consumption.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a method for managing a standby mode of a broadcast receiving apparatus effectively to reduce standby power which is consumed in the broadcast receiving apparatus.

According to an aspect of an exemplary embodiment, there is provided a method for managing a broadcast receiving apparatus standby mode, the method including: generating a power management descriptor that a broadcast receiving apparatus refers to in order to perform a standby mode; and transmitting the generated power management descriptor to the broadcast receiving apparatus.

The power management descriptor may contain information on a standby mode which should be supported by the broadcast receiving apparatus.

The standby mode which should be supported by the broadcast receiving apparatus may include a first standby mode and a second standby mode.

A number of functions that are performed in the first standby mode may be larger than a number of functions that are performed in the second standby mode, and the broadcast receiving apparatus may be switchable between the first standby mode and the second standby mode.

The power management descriptor may contain information on a function that is performed by the broadcast receiving apparatus in the first standby mode.

The method may further include: generating an update descriptor which contains information on update to be performed by the broadcast receiving apparatus in the first standby mode; and transmitting the generated update descriptor to the broadcast receiving apparatus.

The update descriptor may contain information on firmware update to be performed in the first standby mode.

The update descriptor may contain at least one of a firmware update start time, a firmware update effective duration, and firmware scramble information.

The update descriptor may contain information on EIT update to be performed in the first standby mode.

The update descriptor may contain at least one of a type of an EIT, a version of an EIT which is transmitted last, an EIT update start time, an EIT update effective duration, and EIT scramble information.

The type of the EIT may include at least one of an EIT present/follow (P/F) type and an EIT schedule (sch) type.

The update descriptor may contain information on application update to be performed in the first standby mode.

The method may further include: generating a terminal management descriptor which contains information on management to be performed by the broadcast receiving apparatus in the first standby mode; and transmitting the generated terminal management descriptor to the broadcast receiving apparatus.

According to an aspect of another exemplary embodiment, there is provided a method for managing a broadcast receiving apparatus standby mode, the method including: receiving, by a broadcast receiving apparatus, a power management descriptor to refer to in order to perform a standby mode; and running, by the broadcast receiving apparatus, the standby mode with reference to the received power management descriptor.

The power management descriptor may contain information on a standby mode which should be supported by the broadcast receiving apparatus.

According to exemplary embodiments as described above, since the broadcast receiving apparatus such as the STB can manage the standby mode more effectively, standby power consumed in the standby mode can be further reduced and thus power saving effect can be achieved. In particular, unnecessary power consumption of the broadcast receiving apparatus in a non-viewing time zone can be reduced and also some necessary functions can be more effectively performed, and thus there is no problem in service quality.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

1. Broadcasting Service System

Figure 2:
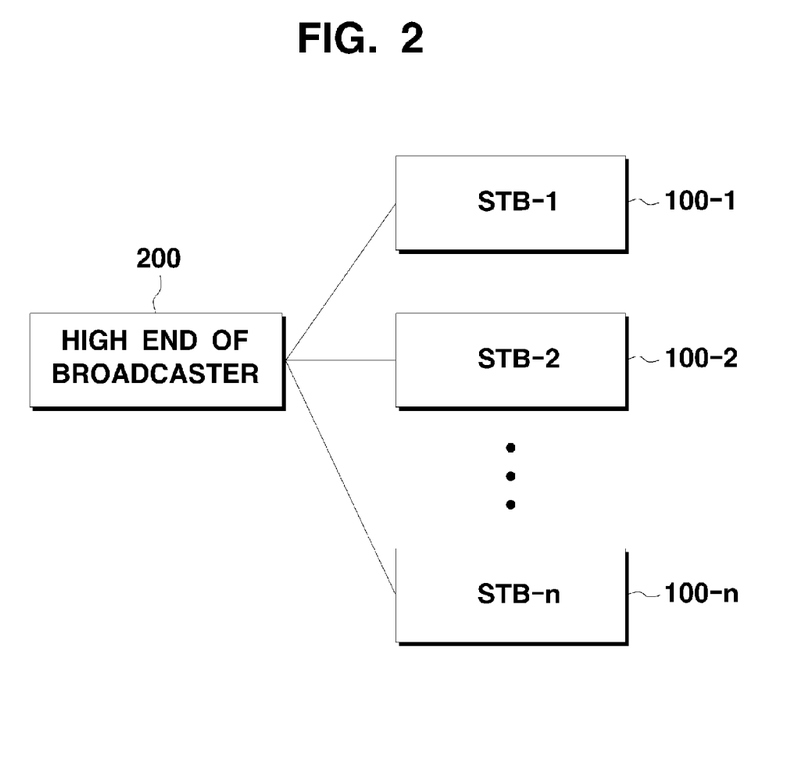
FIG. 2 is a view illustrating a broadcasting service system according to an exemplary embodiment.

FIG. 2 is a view illustrating a broadcasting service system according to an exemplary embodiment. The broadcasting service system according to an exemplary embodiment is established by a high end of a broadcaster 200 and a plurality of STBs 100-1 to 100-*n*.

The high end of the broadcaster 200 provides broadcasts and contents to the STBs 100-1 to 100-*n*. Also, the high end of the broadcaster 200 provide a variety of service information (SI) to the STBs 100-1 to 100-*n*.

Figure 3:
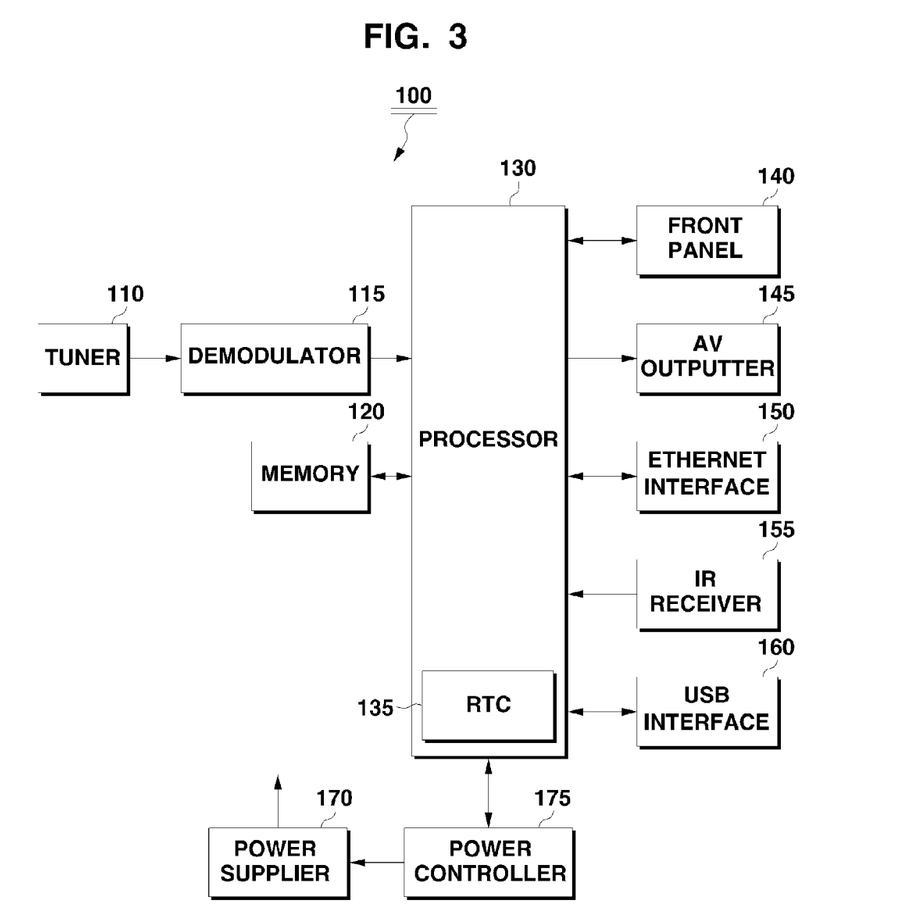
FIG. 3 is a block diagram of a STB illustrated in FIG. 2.

FIG. 3 is a block diagram illustrating a STB using reference numeral 100 as a representative of the STBs of FIG. 2. The STB 100 is a kind of broadcast receiving apparatus and may provide a real-time broadcasting service and a content providing service.

As shown in FIG. 3, the STB 100 includes a tuner 100, a demodulator 115, a memory 120, a processor 130, a real time clock (RTC) 135, a front panel 140, an audio and video (AV) outputter 145, an Ethernet interface 150, an infrared ray (IR) receiver 155, a universal serial bus (USB) interface 160, a power supplier 170, and a power controller 175.

The tuner 110 tunes a broadcast signal of a broadcast channel that is selected by a user from among broadcast signals received from a terrestrial antenna, a cable, a satellite antenna, or the internet, and the demodulator 115 demodulates the broadcast signal which is tuned by the tuner 110.

The processor 130 divides the broadcast signal which is demodulated by the demodulator 115 into a video signal, an audio signal, and a service information (SI) signal. Also, the processor 130 performs video decoding and signal processing with respect to the video signal, and performs audio decoding and signal processing with respect to the audio signal.

The processor 130 controls an overall operation of the STB 100. In particular, the processor 130 controls an operation mode change of the STB 100. This will be explained in detail below.

The memory 120 provides a storage space which is necessary for decoding and signal processing by the processor 130. The RTC 135 functions as a timer.

The front panel 140 is disposed on a front surface of the STB 100, and includes a display to display a current time and an operation state of the STB 100 and buttons to directly receive input of a user command.

Also, the IR receiver 155 and the USB interface 160, which will be described below, are disposed on the front panel 140.

The AV outputter 145 transmits the audio signal and the video signal which are decoded and signal processed by the processor 130 to a TV, which is connected to the STB 100. The AV outputter 145 may output the audio signal and the video signal in various AV outputting methods such as Composite, Component, HDMI and DVI.

The Ethernet interface 150 provides a network interface to access an external network.

The IR receiver 155 receives a user command which is input through a remote controller in the form of infrared rays, and forwards the user command to the processor 130. The USB interface 160 is communicably connected with an external device according to the USB standard.

The power supplier 170 supplies necessary power to the blocks 110, 115, 120, 130, 135, 140, 145, 150, 155, and 160 provided in the STB 100.

The power controller 175 controls a power supply operation of the power supplier 170 according to an operation mode of the STB 100 which is determined by the processor 130. The power supply operation is controlled by restricting the power supplied to the blocks by the power supplier 170.

2. Functions of STB

The functions performed in the STB 100 are divided into a 'main function' and a 'background function'. Each function will be explained in detail below.

2.1. Main Function (Function for User)

Providing Broadcast: The STB outputs audio and video signals of a received real-time broadcast.

Providing Video On Demand (VOD): The STB requests and receives a content selected by the user from the high end of the broadcaster 200, and outputs audio and video signals.

Recording: The STB records a broadcast (including recording a broadcast audio and video signals of which are currently output to provide a delayed broadcast), and records a content;

Executing User Application: The user application is an application that directly provides entertainment or services to the user, and includes an in-bound application and an out-bound application.

Downloading User Application 2.2. Background Function (Function for STB)

Updating STB software (S/W): The STB S/W includes firmware and applications necessary for driving the STB 100:

Updating Event Information Table (ETT)

Managing STB: The STB 100 manages resources of the STB 100.

3. Operation Mode of STB

Figure 4:
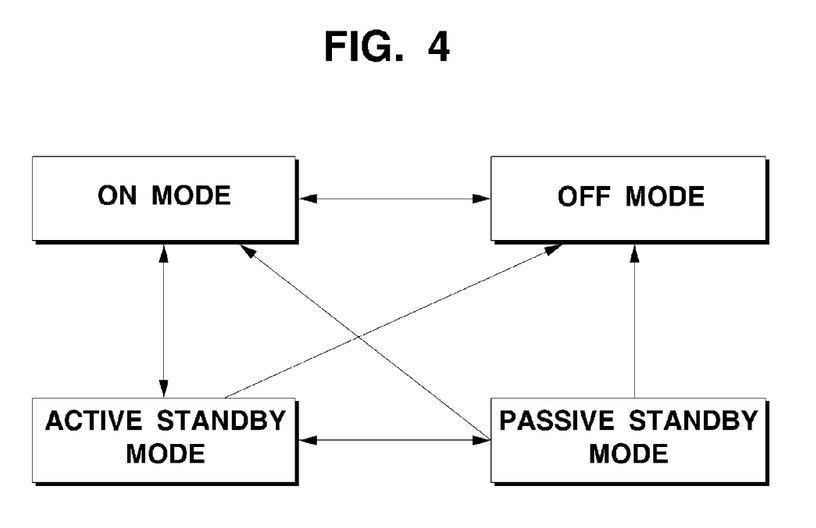
FIG. 4 is an operation mode transition diagram of a STB.

The STB 100 includes four operation modes to reduce power consumption, and an operation mode transition diagram is illustrated in FIG. 4. As shown in FIG. 4, the four operation modes of the STB 100 are an on mode, an active standby mode, a passive standby mode, and an off mode.

As shown in FIG. 4, the STB 100 may change:

1) from the 'on-mode' to the 'active standby mode or off mode';
2) from the 'active standby' mode to the 'on-mode, passive-standby mode or off mode';
3) from the 'passive standby mode' to the 'on mode, active standby mode or off mode'; and
4) from the 'off mode' to the 'on mode'.

Hereinafter, each of the four operation modes of the STB 100 will be explained below.

3.1. On Mode (Active Mode)

The on mode is a mode in which power is supplied to the STB 100 and both the main function and the background function are performed. In the on mode, the STB 100 may selectively perform the main function or the background function and may perform the two functions together.

In the on mode, 1) when the user turns off a power switch and the power to the STB 100 is shut off, the STB 100 changes the on mode to the off mode, and
2) when the user presses an off button, the STB 100 changes the on mode to the active standby mode which will be described below.

There is a difference between the power switch and the off button in that the power switch is a physical switch that is provided on a rear side of the STB 100, and the off button includes an off button which is provided on the front panel 140 of the STB 100 and an off button which is provided on a remote controller.

3.2. Active Standby Mode

The active standby mode is a mode in which power is supplied to the STB 100, and the main function cannot be performed and only the background function can be performed.

In the active standby mode, 1) when a user command is input (irrespective of its kind), the STB 100 changes the active standby mode to the on mode,
2) when the user turns off the power switch and the power to the STB 100 is shut off, the STB 100 changes the active standby mode to the off mode, and
3) when the background function is not performed, the STB 100 changes the active standby mode to the passive standby mode, which will be described below.

A detailed explanation regarding case 3) will be provided below with reference to FIG. 7.

Figure 5:
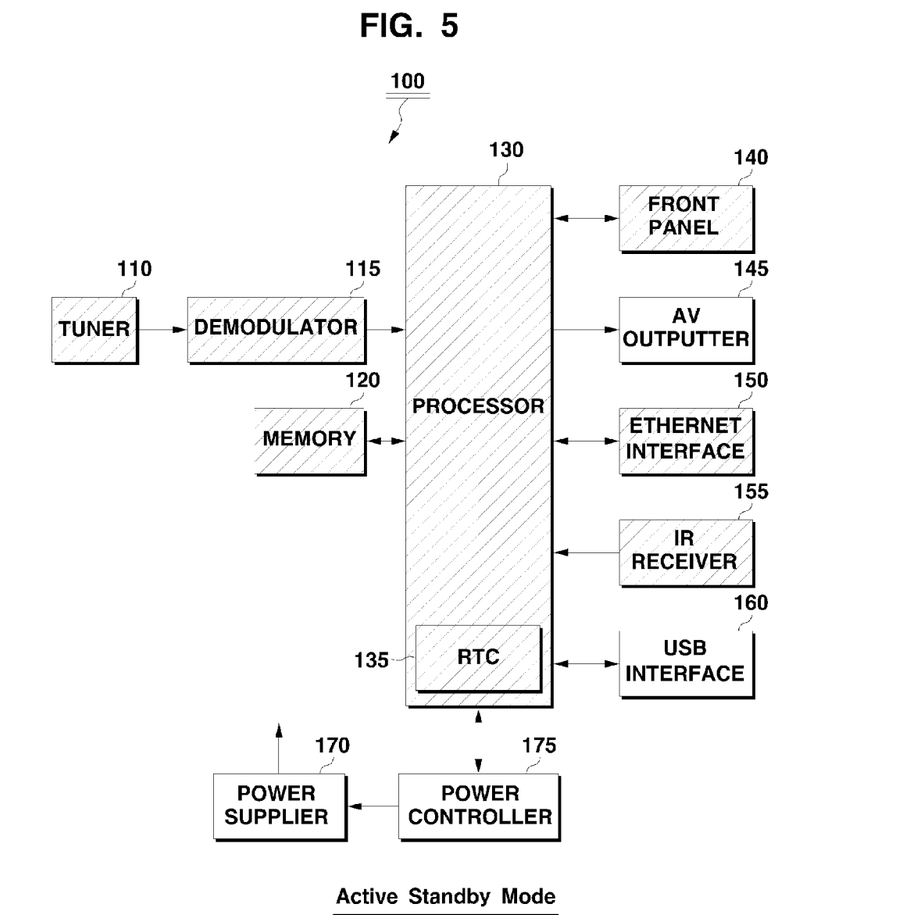
FIG. 5 is a view illustrating a power supply state of a STB in an active standby mode.

FIG. 5 is a view illustrating a power supply state of the STB 100 in the active standby mode. In FIG. 5, the hatched boxes indicate blocks that are supplied with the power from the power supplier 170.

Referring to FIG. 5, in the active standby mode, the power is supplied to the tuner 110, the demodulator 115, the memory 120, the processor 130, the RTC 135, the front panel 140, the Ethernet interface 150, and the IR receiver, which are blocks necessary for performing the background function.

3.3. Passive Standby Mode

The passive standby mode is a mode in which power is supplied to the STB 100 and none of the main function and the background function can be performed. In the passive standby mode, the STB 100 only performs the functions of displaying a current time and an operation state of the STB 100 through the front panel 140, and sensing whether a user command is input or not through the front panel 140 and the IR receiver 155.

Although not mentioned above clearly, the displaying function and the sensing function performed in the passive standby mode are normally performed in the on mode and the active standby mode.

In the passive standby mode, 1) when a user command (irrespective of its kind) is input, the STB 100 changes the passive standby mode to the on mode,
2) when the user turns off the power switch and the power to the STB 100 is shut off, the STB 100 changes the passive standby mode to the off mode, and
3) when a time to perform the background function arrives, the STB 100 changes the passive standby mode to the active standby mode.

A detailed explanation regarding case 3) will be provided below with reference to FIG. 7.

Figure 6:
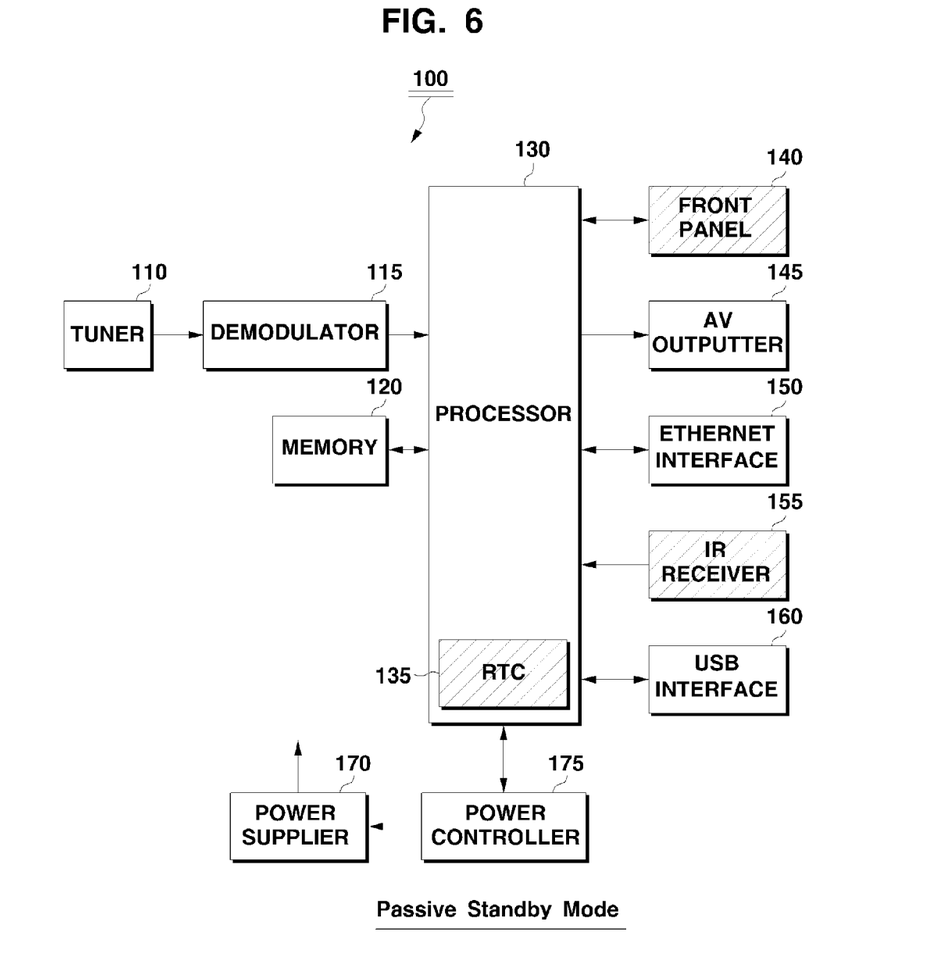
FIG. 6 is a view illustrating a power supply state of a STB in a passive standby mode.

FIG. 6 is a view illustrating a power supply state of the STB 100 in the passive standby mode. The hatched blocks of FIG. 6 indicate blocks that are supplied with the power from the power supplier 170.

Referring to FIG. 6, in the passive standby mode, the power is supplied to the RTC 135, the front panel 140, and the IR receiver 155, which are blocks necessary for performing the above-described displaying function and sensing function.

3.4. Off Mode

The off mode is a mode in which power is not supplied and none of the functions can be performed. That is, in the off mode, the display function and the sensing function performed in the passive standby mode are not performed.

As described above, the STB 100 enters the off mode when the user turns off the power switch.

In the off mode, when the user turns on the power switch and power is supplied to the STB 100, the STB 100 changes the off mode to the on mode.

4. STB Mode Change Based on Self Power Management

When the STB mode is changed based on self power management, the mode switches between the active standby mode and the passive standby mode according to external signaling of the high end of the broadcaster, which provides a broadcast and a content. This will be explained in detail below with reference to FIG. 7.

Figure 7:
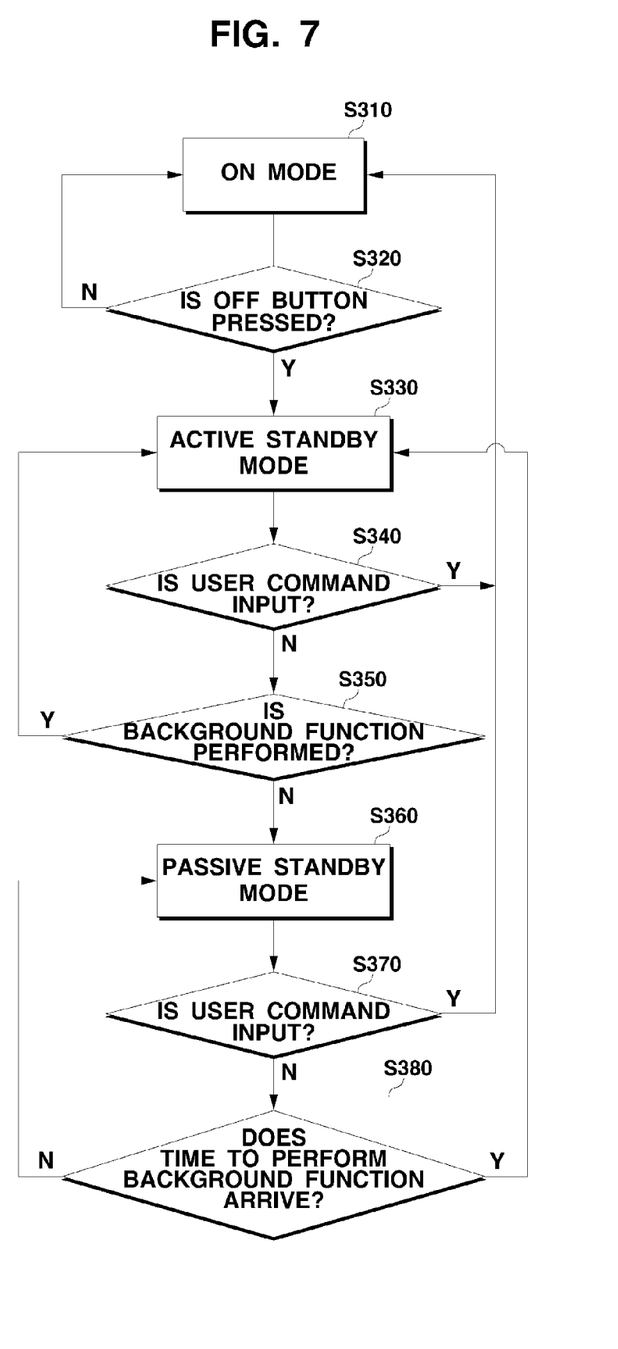
FIG. 7 is a flowchart illustrating a method for changing a STB mode.

FIG. 7 is a flowchart illustrating a method for changing a STB mode according to another exemplary embodiment.

As shown in FIG. 7, when the STB 100 is running in the on mode (S310) and the off button is pressed by the user (S320-Y), the processor 130 changes the operation mode of the STB 100 from the on mode to the active standby mode (S330).

The power supply state of the STB 100 which is changed from the on mode to the active standby mode in operation S330 is illustrated in FIG. 5. In the active standby mode, the STB 100 cannot perform the main function and can perform only the background function.

The background function includes updating the STB SAY, updating the EIT, and managing the STB as described above. The high end of the broadcaster 200 informs the STB 100 of a STB SAY update time, an EIT update time, and a STB management time using external signaling.

Accordingly, when the STB 100 enters the active standby mode, the processor 130 executes an auto power down (APD) daemon and determines when it will perform the background function with reference to the external signaling, which is received from the high end of the broadcaster 200.

On the other hand, when a user command is input in the active standby mode (S340-Y), the processor 130 changes the operation mode of the STB 100 to the on mode (S310). On the other hand, when no user command is input in the active standby mode (S340-N), the processor 130 determines whether the STB 100 is performing the background function (S350).

When it is determined that the background function is being performed (S350-Y), the processor 130 maintains the active standby mode (S330).

On the other hand, when it is determined that the background function is not performed (S350-N), the processor 130 changes the operation mode of the STB 100 to the passive standby mode (S360).

When the STB 100 enters the passive standby mode, the processor 130 runs the RTC 135 according to the background function performing time which is determined when the mode is changed to the active standby mode.

The power supply state of the STB 100 which enters the passive standby mode in operation S360 is illustrated in FIG. 6. Also, in the passive standby mode, the STB 100 may not perform the main function as well as the background function.

When a user command is input in the passive standby mode (S370-Y), the processor 130 changes the operation mode of the STB 100 to the on mode (S310).

On the other hand, when no user command is input in the passive standby mode (S370-N), the processor 130 determines whether the time to perform the background function arrives or not using the RTC 135 (S380).

When it is determined that the time to perform the background function arrives (S380-Y), the processor 130 changes the operation mode of the STB 100 to the active standby mode (S330).

On the other hand, when it is determined that the time to perform the background function does not arrive (S380-N), the processor 130 maintains the passive standby mode.

5. Signaling Standard

Hereinafter, the standard of the external signaling which is provided by the high end of the broadcaster 200 for the sake of self power management in the STB 100 will be explained in detail. Although the signaling standard is suggested in the form of an extended standard of the DVI-SI standard hereinbelow, the technical idea of exemplary embodiments may be applied to standards other than the DVB-SI standard.

5.1. SI Table

Figure 8:
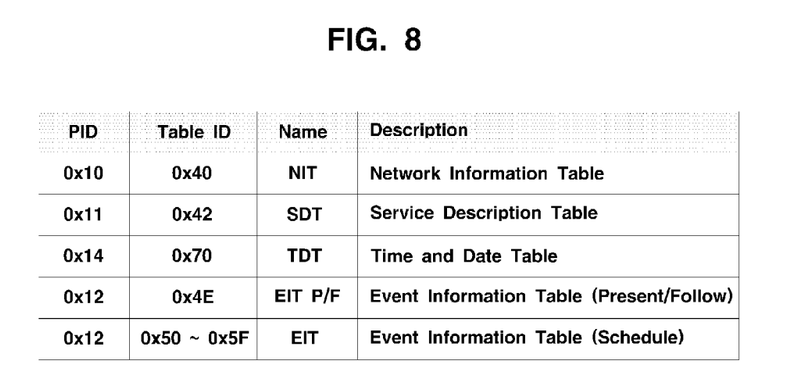
FIG. 8 is a view illustrating service information (SI) tables according to the DVB-SI standard.

FIG. 8 lists SI tables according to the DVB-SI standard. FIG. 8 identifies PIDs and table IDs of the SI tables, which are transmitted according to the DVB-SI standard, such as a network information table (NIT), a service description table (SDT), a time and date table (TDT), an event information table present/follow (EIT P/F), and an event information table schedule (EIT sch).

According to the DVB-SI standard, 1) a transmission frequency of the NIT is 9 hr, 2) a transmission frequency of the SDT is 1.5 hr, 3) a transmission frequency of the TDT is 1 hr, 4) a frequency of the EIT P/F is 1 hr, 5-1) a transmission frequency of the EIT sch on an AV channel is 9 hr, and 5-2) a transmission frequency of the EIT sch on an audio channel is 9 hr.

5.2 SI Descriptor

Figure 9:
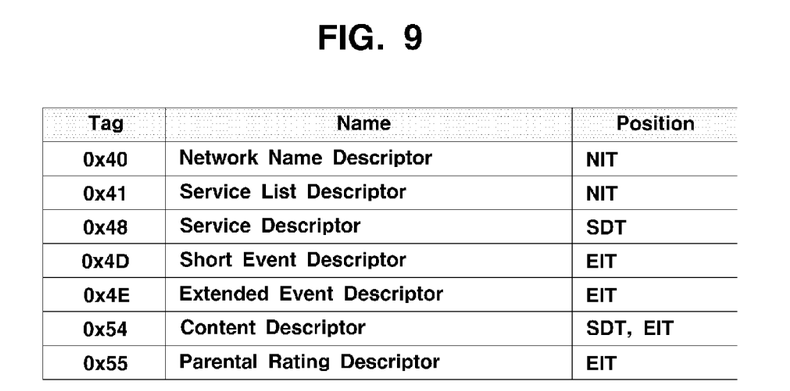
FIG. 9 is a view illustrating SI descriptors according to the DVB-SI standard.

FIG. 9 lists SI descriptors according to the DVB-SI standard. FIG. 9 identifies tags and positions of the SI descriptors, which are transmitted according to the DVB-SI standard, such as a network name descriptor, a service list descriptor, a service descriptor, a short event descriptor, an extended event descriptor, a content descriptor, and a parental rating descriptor.

5.3. External Signaling Descriptor for Self Power Management of STB

Figure 10:
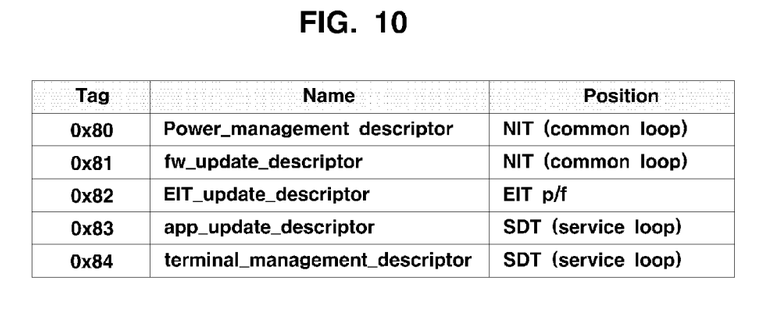
FIG. 10 is a view illustrating external signaling descriptors.

FIG. 10 suggests external signaling descriptors which are referred to when the STB 100 sets a mode switch condition between the active standby mode and the passive standby mode. These descriptors are generated by the high end of the broadcaster 200 and are transmitted to the STB 100.

As shown in FIG. 10, the external signaling descriptors include:

1) a power management descriptor (power_management_descriptor)

2) a firmware update descriptor (fw_update_descriptor)

3) an EIT update descriptor (EIT_update_descriptor)

4) an application update descriptor (app_update_descriptor); and 5) a terminal management descriptor (terminal_management_descriptor)

Referring to FIG. 10, the tags and the positions of the external signaling descriptors are identified.

Hereinafter, each external signaling descriptor will be explained in detail.

5.3.1. Power Management Descriptor (Power Management Descriptor)

Figure 11:
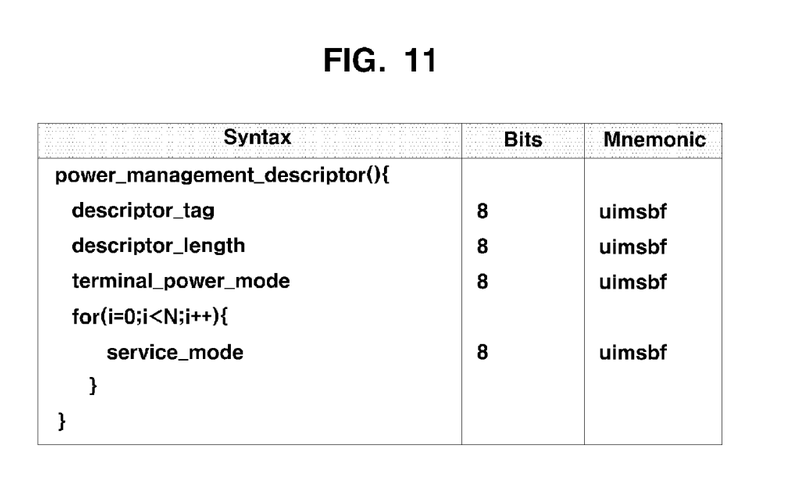
FIG. 11 is a view illustrating a structure of a power management descriptor (a power_management_descriptor)

FIG. 11 illustrates a structure of the power management descriptor (power_management_descriptor). The power management descriptor (power_management_descriptor) is a descriptor that contains information that the STB 100 will refer to when running the standby mode.

Specifically, as shown in FIG. 11, the power management descriptor (power_management_descriptor) contains information on a descriptor tag (descriptor_tag), a descriptor length (descriptor_length), a terminal power mode (terminal_power_mode), and a service mode (service_mode).

The descriptor tag (descriptor_tag) is a tag for identifying the power management descriptor (power_management_descriptor), and is '0x80' as shown in FIG. 10.

The descriptor length (descriptor_length) is information on a length of the power management descriptor (power_management_descriptor).

Figure 12:
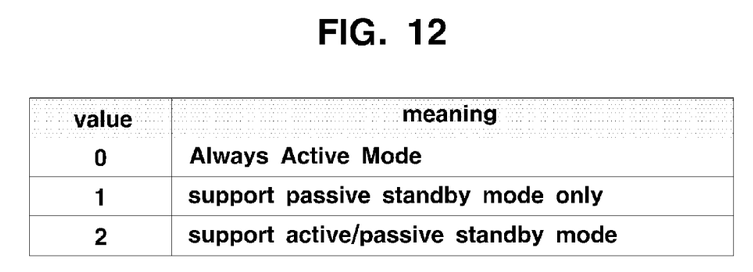
FIG. 12 is a view to explain information which is contained in a terminal power mode (terminal_power_mode)

The terminal power mode (terminal_power_mode) contains information on the standby mode which should be supported by the STB 100. Specifically, the terminal power mode (terminal_power_mode) contains '0', '1', or '2' as shown in FIG. 12.

1) '0' indicates a case in which the STB 100 should be always in the on mode (that is, the STB 100 does not have to support the standby mode), 2) '1' indicates a case in which the STB 100 should support the passive standby mode as the standby mode; and 3) '2' indicates a case in which the STB 100 should support the active standby mode in addition to the passive standby mode as the standby mode.

Figure 13:
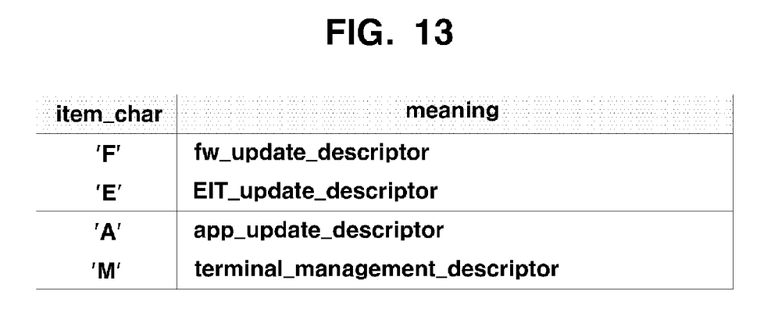
FIG. 13 is a view to explain information which is contained in a service mode (service_mode)

The service mode (service_mode) contains information for informing the external signaling descriptors which are provided by the high end of the broadcaster 200. That is, the information contained in the service mode (service_mode) may refer to information on the background functions that may be performed by the STB 100 in the active standby mode.

The information contained in the service mode (service_mode) is illustrated in FIG. 13. When 'F' and 'E' are contained in the service mode (service_mode), the high end of the broadcaster 200 may provide the firmware update descriptor (fw_update_descriptor) and the EIT update descriptor (EIT_update_descriptor), and, when 'E', 'A', and 'M' are contained in the service mode (service_mode), the high end of the broadcast 200 may provide the EIT update descriptor (EIT_update_descriptor), the application update descriptor (app_update_descriptor), and the terminal management descriptor (terminal_management_descriptor).

On the other hand, 'N' in FIG. 11 is a number of characters ('F', 'E', 'A', and 'M') contained in the service mode (service_mode) minus 1. For example, when 'E', 'A', and 'M' are contained in the service mode (service_mode), 'N' is "2" (=3−1).

5.3.2. Firmware Update Descriptor (fw Update Descriptor)

Figure 14:
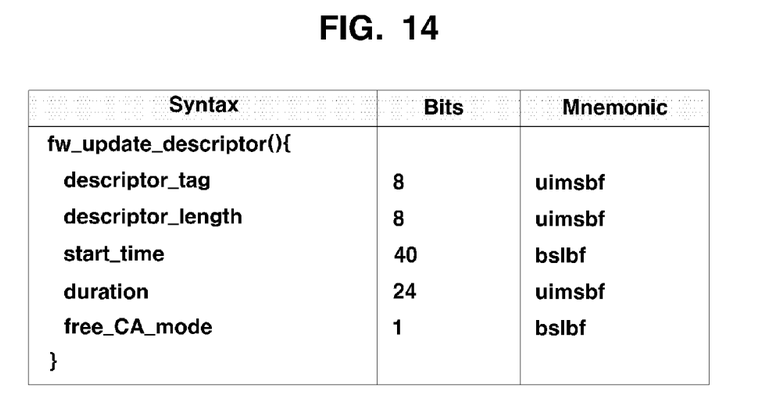
FIG. 14 is a view illustrating a structure of a firmware update descriptor (fw_update_descriptor)

FIG. 14 illustrates a structure of the firmware update descriptor (fw_update_descriptor). The firmware update descriptor (fw_update_descriptor) is a descriptor that contains information on firmware update to be performed by the STB 100 in the active standby mode.

Specifically, as shown in FIG. 14, the firmware update descriptor (fw_update_descriptor) contains information on a descriptor tag (descriptor_tag), a descriptor length (descriptor_length), a start time (start_time), an effective duration (duration), and a free CA mode (free_CA_mode).

The descriptor tag (descriptor_tag) is a tag for identifying the firmware update descriptor (fw_update_descriptor), and is '0x81' as shown in FIG. 10.

The descriptor length (descriptor_length) is information on a length of the firmware update descriptor (fw_update_descriptor).

The start time (start_time) contains information on a firmware update start time of the STB 100, that is, information on a time at which the high end of the broadcaster 200 starts providing updated firmware to the STB 100. A format of the start time (start_time) uses a combination of universal time, CO-ordinated (UTC) and modified Julian date (MJD).

The effective duration (duration)) contains information on a firmware update effective duration of the STB 100, that is, information on a time during which the high end of the broadcaster 200 provides updated firmware to the STB 100. The effective duration may be expressed by a code indicating hours, minutes, and seconds (for example, 01:45:30 is expressed by 0x014530).

The free CA mode (free_CA_mode) contains scramble information on the firmware. Specifically, '0' is contained in the free CA mode (free_CA_mode) when the firmware is not scrambled, and '1' is contained in the free CA mode (free_CA_mode) when the firmware is scrambled.

5.3.3. EIT Update Descriptor (EIT Update Descriptor)

Figure 15:
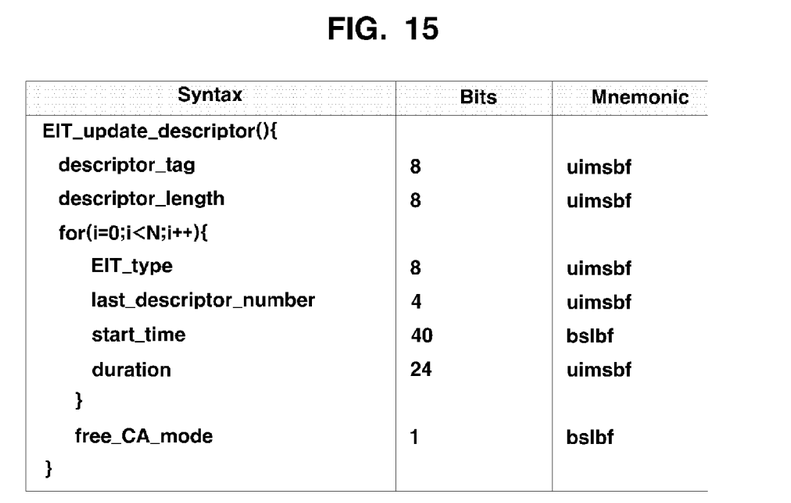
FIG. 15 is a view illustrating a structure of an event information table (EIT) update descriptor (EIT_update_descriptor)

FIG. 15 illustrates a structure of the EIT update descriptor (EIT_update_descriptor). The EIT update descriptor (EIT_update_descriptor) is a descriptor that contains information on EIT update to be performed by the STB 100 in the active standby mode.

Specifically, as shown in FIG. 15, the EIT update descriptor (EIT_update_descriptor) contains information on a descriptor tag (descriptor_tag), a descriptor length (descriptor_length), an EIT type (EIT_type), a last descriptor number (last_descriptor_number), a start time (start_time), an effective duration (duration), and a free CA mode (free_CA_mode).

The descriptor tag (descriptor_tag) is a tag for identifying the EIT update descriptor (EIT_update_descriptor), and is '0x82' as shown in FIG. 10.

The descriptor length (descriptor_length) is information on a length of the EIT update descriptor (EIT_update_descriptor).

Figure 16:
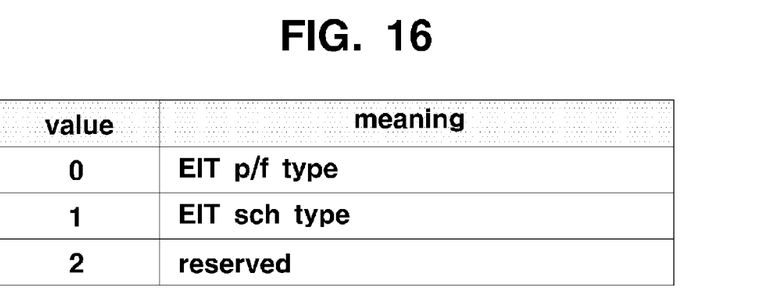
FIG. 16 is a view to explain information which is contained in an EIT type (EIT_type)

The EIT type (EIT_type) contains information on a type of EIT to be transmitted. Specifically, as shown in FIG. 16, 1) when '1' is contained in the EIT type (EIT_type), the type of the EIT is an EIT P/F, and, 2) when '0' is contained in the EIT type (EIT_type), the type of the EIT is an EIT sch type.

The last descriptor number (last_descriptor_number) contains information on a version of the most recent EIT.

The start time (start_time) contains information on an EIT update start time of the STB 100, that is, information on a time at which the high end of the broadcaster 200 starts providing an updated EIT to the STB 100. A format of the start time (start_time) uses a combination of universal time, CO-ordinated (UTC) and modified Julian date (MJD).

The effective duration (duration) contains information on an EIT update effective duration of the STB 100, that is, information on a time during which the high end of the broadcaster 200 provides an updated EIT to the STB 100. The effective duration (duration) may be expressed by a code indicating hours, minutes, and seconds (for example, 01:45:30 is expressed by 0x014530).

The free CA mode (free_CA_mode) contains scramble information on the EIT. Specifically, '0' is contained in the free CA mode (free_CA_mode) when the EIT is not scrambled, and '1' is contained in the free CA mode (free_CA_mode) when the EIT is scrambled.

5.3.4. Application Update Descriptor (App Update Descriptor)

The application update descriptor (app_update_descriptor) is a descriptor that contains information on application update to be performed by the STB 100 in the active standby mode.

A descriptor tag (descriptor_tag) for identifying the application update descriptor (app_update_descriptor) is '0x83' as shown in FIG. 10.

5.3.5. Terminal Management Descriptor (Terminal Management Descriptor)

Figure 17:
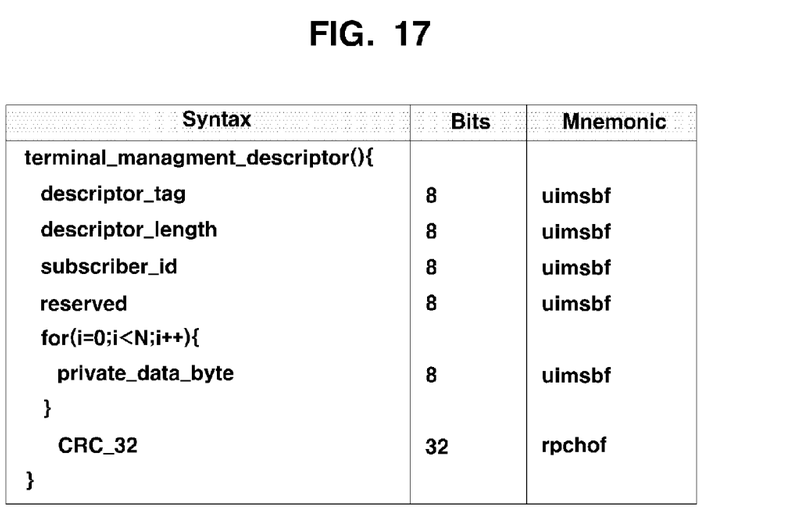
FIG. 17 is a view illustrating a structure of a terminal management descriptor (terminal_management_descriptor).

FIG. 17 illustrates a structure of the terminal management descriptor (terminal_management_descriptor). The terminal management descriptor (terminal_management_descriptor) is a descriptor that contains information for managing the STB 100 in the active standby mode.

Specifically, as shown in FIG. 17, the terminal management descriptor (terminal_management_descriptor) contains information on a descriptor tag (descriptor_tag), a descriptor length (descriptor_length), a subscriber ID (subscriber_id), a reserved area (reserved), and private data (private_data_byte), and CRC.

The descriptor tag (descriptor_tag) is a tag for identifying the terminal management descriptor (terminal_management_descriptor), and is '0x84' as shown in FIG. 10.

The descriptor length (descriptor_length) is information on a length of the terminal management descriptor (terminal_management_descriptor).

The subscriber ID (subscriber_id) is an ID for designating the STB 100, which is a subscriber.

The private data (private_data_byte) is information necessary for managing the STB 100, and a detailed content thereof is defined by the broadcaster.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for managing standby modes of a broadcast receiving apparatus the method comprising:

generating, by a broadcaster, a power management descriptor that the broadcast receiving apparatus refers to in order to manage the standby modes, the broadcaster providing a broadcast and a content;

transmitting, by the broadcaster, the generated power management descriptor to the broadcast receiving apparatus;

wherein the power management descriptor contains information on standby modes supported by the broadcast receiving apparatus, wherein the standby modes comprises a first standby mode and a second standby mode, wherein a number of functions that are performed in the first standby mode is larger than a number of functions that are performed in the second standby mode, wherein the broadcast receiving apparatus is switchable between the first standby mode and the second standby mode, and wherein the power management descriptor further contains information on a function that is performed by the broadcast receiving apparatus in the first standby mode;

generating, by the broadcaster, an update descriptor which contains information on update to be performed by the broadcast receiving apparatus in the first standby mode but not in the second standby mode; and transmitting, by the broadcaster, the generated update descriptor to the broadcast receiving apparatus.

2. The method as claimed in claim 1, wherein the update descriptor contains information on firmware update to be performed in the first standby mode but not in the second standby mode.

3. The method as claimed in claim 2, wherein the update descriptor contains at least one of firmware update start time information, firmware update effective duration information, and firmware scramble information.

4. The method as claimed in claim 1, wherein the update descriptor contains information on an event information table (EIT update to be performed in the first standby mode but not in the second standby mode.

5. The method as claimed in claim 4, wherein the update descriptor contains at least one of type information of the EIT, version information of an EIT which is transmitted last, EIT update start time information, EIT update effective duration information, and EIT scramble information.

6. The method as claimed in claim 5, wherein the type of the EIT comprises at least one of EIT present/follow (P/F) type information and EIT schedule (sch) type information.

7. The method as claimed in claim 1, wherein the update descriptor contains information on application update to be performed in the first standby mode but not in the second standby mode.

8. The method as claimed in claim 1, further comprising:
generating a terminal management descriptor which contains information on management to be performed by the broadcast receiving apparatus in the first standby mode but not in the second standby mode; and transmitting the generated terminal management descriptor to the broadcast receiving apparatus.

9. A method for managing a broadcast receiving apparatus standby mode, the method comprising:
receiving, by a broadcast receiving apparatus, a power management descriptor and an update descriptor to refer to in order to manage standby modes of the broadcast receiving apparatus from a broadcaster providing a broadcast and a content, wherein the power management descriptor and the update descriptor are generated by the broadcaster, wherein the power management descriptor contains information on standby modes supported by the broadcast receiving apparatus, wherein the standby modes comprises a first standby mode and a second standby mode, wherein a number of functions that are performed in the first standby mode is larger than a number of functions that are performed in the second standby mode, wherein the broadcast receiving apparatus is switchable between the first standby mode and the second standby mode, wherein the power management descriptor further contains information on a function that is performed by the broadcast receiving apparatus in the first standby mode, and wherein the update descriptor contains information on update to be performed by the broadcast receiving apparatus in the first standby mode but not in the second standby mode; and running, by the broadcast receiving apparatus, the first standby mode with reference to the received power management descriptor and the received update descriptor.

10. The method as claimed in claim 1, wherein the power management descriptor contains:
descriptor tag information for identifying the power management descriptor;
descriptor length information regarding a length of the power management descriptor; and
service mode information for informing external signaling descriptors provided by the broadcaster.

11. The method as claimed in claim 2, wherein the update descriptor contains firmware update start time information, firmware update effective duration information, and firmware scramble information.

12. The method as claimed in claim 4, wherein the update descriptor contains type information of the EIT, a version information of an EIT which is transmitted last, EIT update start time information, EIT update effective duration information, and EIT scramble information.

* * * * *